US009841783B2

(12) United States Patent
Anderson

(10) Patent No.: US 9,841,783 B2
(45) Date of Patent: Dec. 12, 2017

(54) SYSTEM TO ACCOUNT FOR IRREGULAR DISPLAY SURFACE PHYSICS

(71) Applicant: INTEL CORPORATION, Santa Clara, CA (US)

(72) Inventor: Glen J. Anderson, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 188 days.

(21) Appl. No.: 14/128,056

(22) PCT Filed: Sep. 12, 2013

(86) PCT No.: PCT/US2013/059455
§ 371 (c)(1),
(2) Date: Dec. 20, 2013

(87) PCT Pub. No.: WO2015/038128
PCT Pub. Date: Mar. 19, 2015

(65) Prior Publication Data
US 2015/0070382 A1    Mar. 12, 2015

(51) Int. Cl.
*G09G 5/00* (2006.01)
*G06F 1/16* (2006.01)
*G06F 3/0487* (2013.01)

(52) U.S. Cl.
CPC ............ *G06F 1/1626* (2013.01); *G06F 1/163* (2013.01); *G06F 1/1637* (2013.01);
(Continued)

(58) Field of Classification Search
CPC ....... G06T 11/60; G06T 15/005; G06T 19/00; G09G 5/14
(Continued)

(56) References Cited

U.S. PATENT DOCUMENTS

2008/0062164 A1    3/2008    Bassi et al.
2010/0060661 A1*   3/2010    Avent ..................... A63F 13/10
                                                                  345/619
(Continued)

FOREIGN PATENT DOCUMENTS

KR    10-2012-0121647 A    11/2012
WO    2006/031214 A1    3/2006
WO    2013077883 A1    5/2013

OTHER PUBLICATIONS

International Search Report and Written Opinion received for PCT Patent Application No. PCT/US2013/059455, dated Jun. 26, 2014, 12 pages.
(Continued)

*Primary Examiner* — Tize Ma
*Assistant Examiner* — Sarah Lhymn
(74) *Attorney, Agent, or Firm* — Grossman, Tucker, Perreault & Pfleger, PLLC

(57) ABSTRACT

This disclosure is directed to a system to account for irregular display surface physics. In one embodiment, an example device may comprise a display including at least one curved surface on which content may be presented. The content may be presented based at least on simulated physical behavior associated with the curved surface. For example, the device may determine the display surface configuration, determine the simulated physical behavior in the content and present the content based at least on these determinations. The content may then appear to behave in accordance with the physics of the curved surface. The device may also comprise sensors to determine at least one of device or environmental condition such as, for example, gravitational force direction, device motion, etc. The device may then take into account the physical behavior associated (Continued)

with the curved surface in view of sensed device or environmental condition when presenting the content.

20 Claims, 6 Drawing Sheets

(52) U.S. Cl.
CPC .......... *G06F 1/1694* (2013.01); *G06F 3/0487* (2013.01); *G06F 2200/1637* (2013.01)

(58) Field of Classification Search
USPC ....... 345/418, 419, 421, 426, 427, 501, 619, 345/625, 629, 630
See application file for complete search history.

(56) References Cited

U.S. PATENT DOCUMENTS

| | | | | |
|---|---|---|---|---|
| 2010/0128112 A1* | 5/2010 | Marti | ............... | G06F 3/011 348/51 |
| 2012/0081276 A1* | 4/2012 | Ullrich | ............... | G06F 1/1626 345/156 |
| 2012/0086625 A1* | 4/2012 | Takeda | ............... | G02B 6/0006 345/8 |
| 2012/0105326 A1* | 5/2012 | Jeong | ............... | G06F 3/002 345/158 |
| 2012/0327297 A1 | 12/2012 | Roberts et al. | | |
| 2013/0002724 A1* | 1/2013 | Heinrich | ............... | G06F 1/163 345/676 |
| 2013/0079079 A1 | 3/2013 | Bouchard et al. | | |
| 2013/0162556 A1* | 6/2013 | Yu | ............... | G06F 3/041 345/173 |
| 2013/0286004 A1* | 10/2013 | McCulloch | ............... | G06T 19/006 345/419 |

OTHER PUBLICATIONS

Marin, Emmanuel, Physics and Augmented Reality—Part 2, https://www.youtube.com/watch?v=umbTreYhidM, Jun. 24, 2006.

International Preliminary Report on Patentability received for PCT Application No. PCT/US2013/059455, dated Mar. 24, 2016, 9 pages.

* cited by examiner

SYSTEM TO ACCOUNT FOR IRREGULAR DISPLAY SURFACE PHYSICS

TECHNICAL FIELD

The present disclosure relates to the presentation of content on a device display, and more particularly, to a system for presenting simulated physical behavior on a curved display.

BACKGROUND

Emerging advances in display technology are now starting to yield displays that are not only better performing, but also more flexible in terms of implementation. For example, advances in materials (e.g., flexible substrates) and assembly methods are allowing different geometries of displays to become available. Non-planar displays (e.g., including at least one curved surface) are now able to be manufactured. Displays including curved surfaces may be employed in a in a variety of devices. For example, standalone monitors may "wrap-around" a user of a computing device to create a more immersive experience when consuming content such as watching televisions shows or movies, playing games, etc. Curved displays may also allow larger displays to be incorporated into devices that do not include enough real estate to utilize a planar screen. For example, recently there has been increased interested in wearable computing devices. Computing devices may be worn on the wrist of a user, incorporated into eyewear, etc. To maintain a stylish appeal, the size of such devices may be limited, and thus, using displays including curved surfaces may be beneficial both functionally and stylistically.

While using displays including curved surfaces may be beneficial from the standpoint of style and the ability to incorporate larger screens into smaller devices, the implementation of such displays may be problematic from a use standpoint. For example, an existing planar display provides a user of the display (e.g., a viewer) with a fixed and/or uniform perspective. This perspective is similar in various devices (e.g., televisions, movie screens, etc.), allowing media to be ported from one device to another without substantial change. However, curved displays may incorporate variable perspective depending on the viewer position. In addition, devices including curved displays that may be worn by a user may constantly be moving with respect to the perspective of the viewer. These different and variable conditions make it more challenging to present content on the display of the device, especially when at least one goal is to present content in manner that attempts to simulate real-world behavior for the content.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
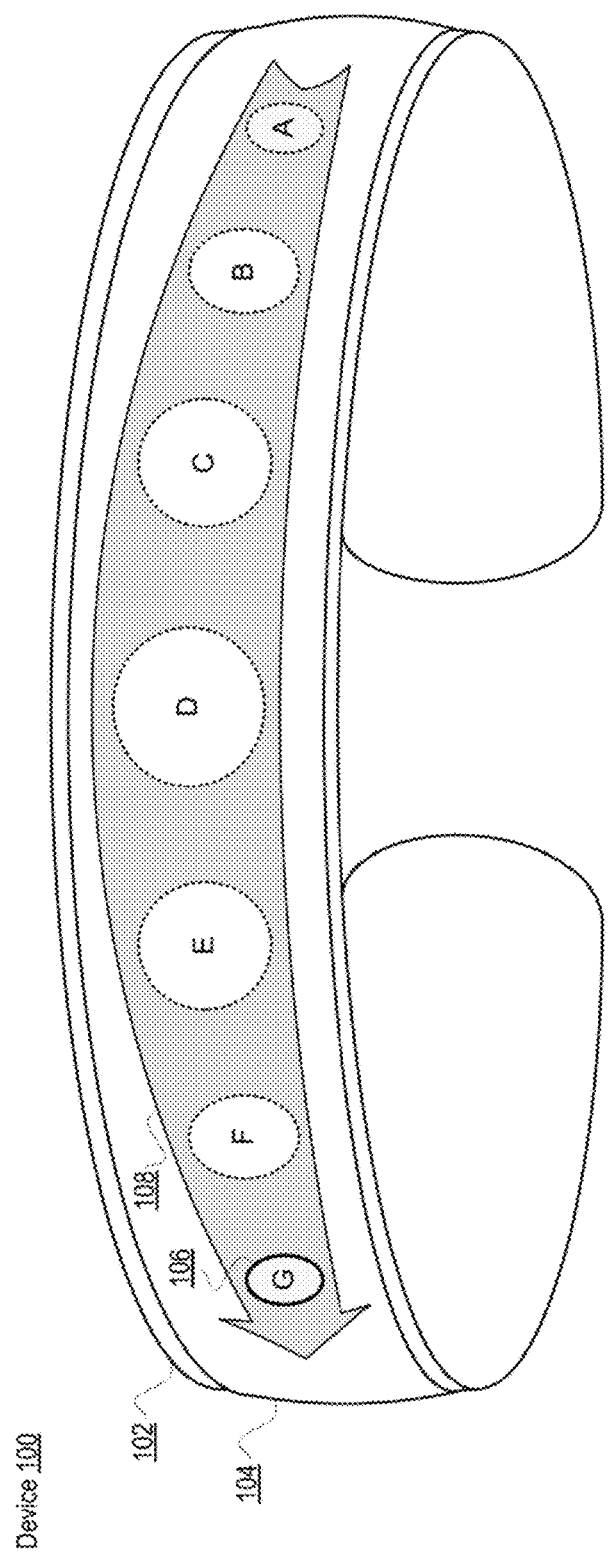
FIG. 1 illustrates an example device comprising a system to account for irregular display surface physics in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a system to account for irregular display surface physics. In one embodiment, an example device may comprise a display including at least one curved surface. Content (e.g., an image, video, games, etc.) may be presented on the display. A user interface module also in the device may cause the content to be presented based at least on simulated physical behavior associated with the curved surface. For example, the device may determine the display surface configuration, determine the simulated physical behavior in the content and then present the content based at least on these determinations. The content may then appear to behave in accordance with the physics of the curved surface. For example, the content may appear to physically react to the incline of the curved surface. The device may also comprise sensors to determine at least one of device or environmental condition such as, for example, gravitational force direction, device motion, etc. The device may then take into account the physical behavior associated with the curved surface in view of sensed device or environmental conditions when presenting the content.

In one embodiment there is provided a device comprising, for example, a display and a user interface module. The display may include at least one curved surface on which content may be presented. The user interface module may be to cause the content to be presented on the display based at least on simulated physical behavior associated with the curved surface. The display may be incorporated within the device or may be external to the device and coupled to at least the user interface module via a wired or wireless link.

The user interface module may be to cause a portion of content to be presented differently based on where on the curved surface the portion of content is to be presented. For example, the user interface module may be to cause the portion of content to be presented differently based on simulated physical movement of the portion of content across the curved surface. The simulated physical movement of the portion of content across the curved surface may be caused by user touch interaction with the curved surface. The user interface module may further be to cause the portion of content to be presented differently based on a simulated physical distance of the portion of content from the curved surface during the simulated physical movement of the portion of content across the curved surface.

In the same or another embodiment, the display may comprise a plurality of surfaces in a non-planar arrangement and the user interface module may be to cause the portion of content to be presented differently based on the simulated physical distance and the simulated physical location of the portion of content with respect to a particular surface in the plurality of surfaces on which the portion of content is to be displayed. The device may further comprise at least one sensor to sense at least one of device conditions or environmental conditions. The at least one sensor may be to sense, for example, gravitational force direction and the user interface module may be to cause the portion of content to be presented on the curved surface based also on the sensed gravitational force direction. The at least one sensor may also be to sense movement of the device and the user interface module is to cause the portion of content to be presented on the curved surface based also on the sensed movement of the device. The user interface module may further be to cause at least one of sound output or tactile output to be generated by the device based at least on the simulated physical behavior associated with the curved surface. An example method consistent with embodiments of the present disclosure may include determining in a device a configuration for a display including at least one curved surface on which content is presented, determining simulated physical behavior in the content and causing the content to be displayed based at least on simulated physical behavior associated with the curved surface.

FIG. 1 illustrates an example device comprising a system to account for irregular display surface physics in accordance with at least one embodiment of the present disclosure. Initially, device 100 has been depicted as a wearable computing device (e.g., a bracelet-type device comprising processing, display and/or communication functionality). Though device 100 has been depicted in a particular wearable format, it is not limited only to the illustrated configuration. Device 100 may be any device incorporating or coupled to a display including a curved surface. Other examples of device 100 may include, but are not limited to, a mobile communication device such as a cellular handset or a smartphone based on the Android® operating system (OS), iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a stationary computing device such as a desktop computer, a set-top device, a smart television (TV), etc.

Device 100 may comprise a central processing unit (CPU) 102 to which is coupled a display 104. In the example shown in FIG. 1. CPU 102 is the portion of device 100 making up a wearable bracelet portion of device 100 comprising a housing that may include various resources such as processing, interface, communication, power supply, etc. in device 100. It is important to note that the configuration of CPU 102 and display 104 may vary depending on, for example, the particular application for which device 100 is being implemented. In accordance with the various embodiments disclosed herein, display 104 may be constructed using any technology existing now or in the future that allows for the formation of a curved surface in the display. For example, display 104 may be based on various technologies such as, but not limited to, cathode ray tube (CRT), plasma, light-emitting diode (LED), Organic LED (OLED), Active-matrix OLED (AMOLED), etc.

In an example of operation, a portion of content (hereafter "content object 106") is illustrated during presentation at various locations on display 104. More specifically, content object 106 is shown at locations A to G moving following arrow 108 from right to left across display 104. For example, content object 106 may be a representation of a sun/moon moving across the sky, a ball or other game piece that may be "launched" across display 104 utilizing a finger flick action or a drawing back action simulating a slingshot, etc. While the shape of content object 106 may be circular, the presentation of content object 106 on display 104 may differ in size, shape, color, speed of movement, etc. depending on its location on the curved surface. These changes represent the application of physics to the presentation based on the curved surface of display 104 to the representation of content object 106. The application of physics, as referenced herein, may comprise alterations made to the representation of content object 106 to create the effect of a physical object reacting to at least the curvature of display 104 at the particular location. As a result, from a viewing perspective where a user is looking directly down at device 100, the representation of content object 104 may be largest and most symmetrical at location D. At locations C and E the size of content object 106 may appear to be smaller and the shape of the object may distort. This effect may be enhanced at locations B and F, and made more extreme at locations A and G where color tone changes may also be carried out to cause content object 106 to appear to be in the shade. Moreover, the speed at which content object 106 moves across display 104 may vary depending upon the curvature of the surface. Further examples of simulated physical behavior are discussed in FIG. 3-5.

Figure 2:
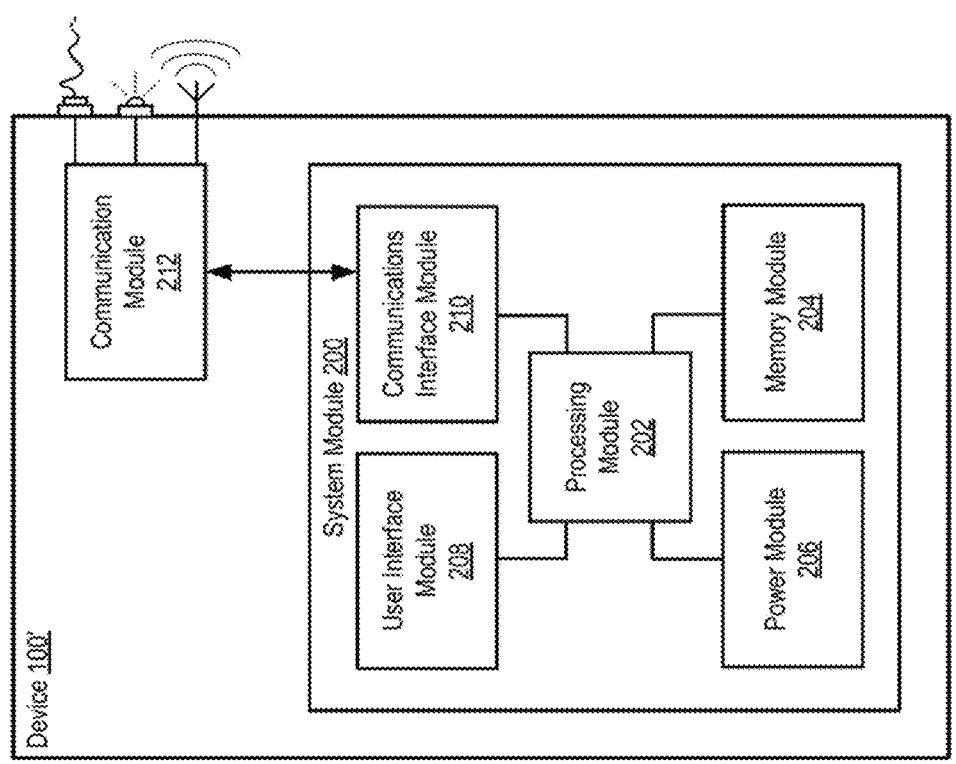
FIG. 2 illustrates an example configuration for a device usable in accordance with at least one embodiment of the present disclosure.

FIG. 2 illustrates an example configuration for a device usable in accordance with at least one embodiment of the present disclosure. In particular, while device 100' may perform example functionality such as disclosed in FIG. 1, device 100' is meant only as an example of equipment usable in accordance with embodiments consistent with the present disclosure, and is not meant to limit these various embodiments to any particular manner of implementation.

Device 100' may comprise system module 200 configured to manage device operations. System module 200 may include, for example, processing module 202, memory module 204, power module 206, user interface module 208 and communication interface module 210 that may be configured to interact with communication module 212. While communication module 212 is shown separately from system module 200, this arrangement is merely for the sake of explanation herein. Some or all of the functionality associated with communication module 212 may also be incorporated within system module 200.

In device 100', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families. Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc, in device 100'. Some or all of the functionality commonly associated with the support circuitry may also be included in the same physical package as a microprocessor (e.g., in an SoC package like the Sandy Bridge integrated circuit available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include memory configured to hold information during the operation of device 100' such as, for example, static RAM (SRAM) or Dynamic RAM (DRAM). ROM may include memories such as bios memory configured to provide instructions when device 100' activates in the form of bios, Unified Extensible Firmware Interface (UEFI), etc., programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 100' with the power needed to operate.

User interface module 208 may include circuitry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB). Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, wireless local area networking (WLAN), Wi-Fi, etc.) and long range wireless mediums (e.g., cellular wide area radio communication technology, satellite technology, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, user interface module 208 may interact with display 104, such as disclosed in FIG. 1, to present content. In support of this activity, user interface module 208 may comprise, for example, equipment (e.g., video processors, chipsets, cards, etc.) and/or software (e.g., video compressors/decompressors (codecs), drivers, physics engines, etc.) usable for causing the content to be presented on display 104 based at least on simulated physical behavior associated with the curved surface. The content for presentation (e.g., images, video, games, etc.) may be, for example, retrieved from memory module 104 or may be "streamed" (e.g., may be received continuously from a source outside of device 100') through communication module 212 utilizing wired and/or wireless communication.

Figure 3:
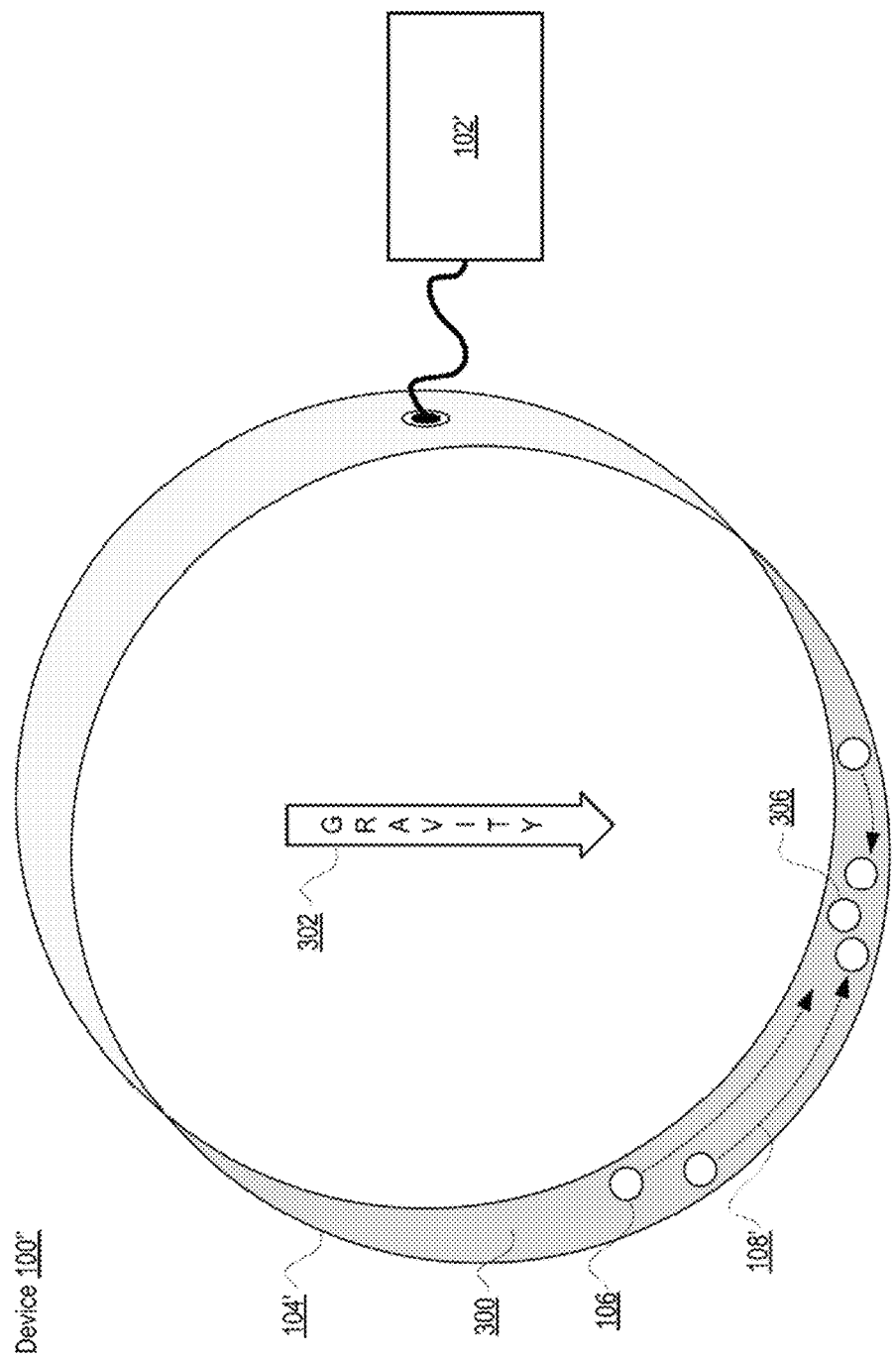
FIG. 3 illustrates an example device comprising a system to account for gravitational force in accordance with at least one embodiment of the present disclosure.

FIG. 3 illustrates an example device comprising a system to account for gravitational force in accordance with at least one embodiment of the present disclosure. Example device 100" may comprise at least CPU 102' and display 104'. While CPU 102' and display 104' are illustrated as separate components coupled by a wire, this configuration is not intended to be limiting and is merely for the sake of explanation. Consistent with various embodiments of the present disclosure, it is also possible for display 104' to be incorporated into CPU 102', may be coupled to CPU 102' via a wireless connection, etc.

Display 104' may comprise at least one curved surface 300 on which content may be presented. While only the interior surface of display 104' is being utilized in the example of FIG. 3, the exterior surface of display 104' may also be used for presenting content. In one embodiment, CPU 102' and or display 104' may comprise at least one sensor. The at least one sensor may be configured to sense device conditions and/or environmental conditions. Example device conditions may include, but are not limited to, device location, orientation, movement and/or acceleration (e.g., based on gravitational force direction sensing. Global Positioning System (GPS) coordinates, wireless signal-based location estimation, etc.), proximity (e.g., based on touch sensing, magnetic field sensing, wireless signal sensing, etc.), device temperature, etc. Example environmental conditions may include, but are not limited to, gravitational force direction, sounds (e.g., user commands, ambient noises, etc.), ambient light level and/or direction, magnetic fields, ambient temperature, wireless signal source direction and/or distance, etc. The at least one sensor may generate sensor information that may be employed (e.g., by user interface module 208) when presenting content on display 104'. For example, device 100" may comprise at least one sensor to sense gravitation force direction 302, and may cause content object 106 to move (e.g., fall, roll, slip, etc.) in the direction of gravitational force 302. As shown by arrow 108', content objects 106 may roll down towards location 306 at the lowest point of display 104' consistent with gravitational force 302. Moreover, the speed at which content objects 106 rolls may depend upon, for example, the slope of the curved surface 300 of display 104'. In one embodiment, the displayed simulation of physical behavior may be accompanied by other outputs from device 100" that further enhance the simulation. Examples of other outputs may include, but are not limited to, the generation of sound simulating rolling, falling, impacting, etc. objects, haptic (e.g., tactile) feedback simulating the vibration, impact, etc. that may be generated by moving objects, etc. haptic feedback may be especially effective in worn devices for enhancing user experience because these devices are usually in contact with some portion of the user's body.

Figure 4:
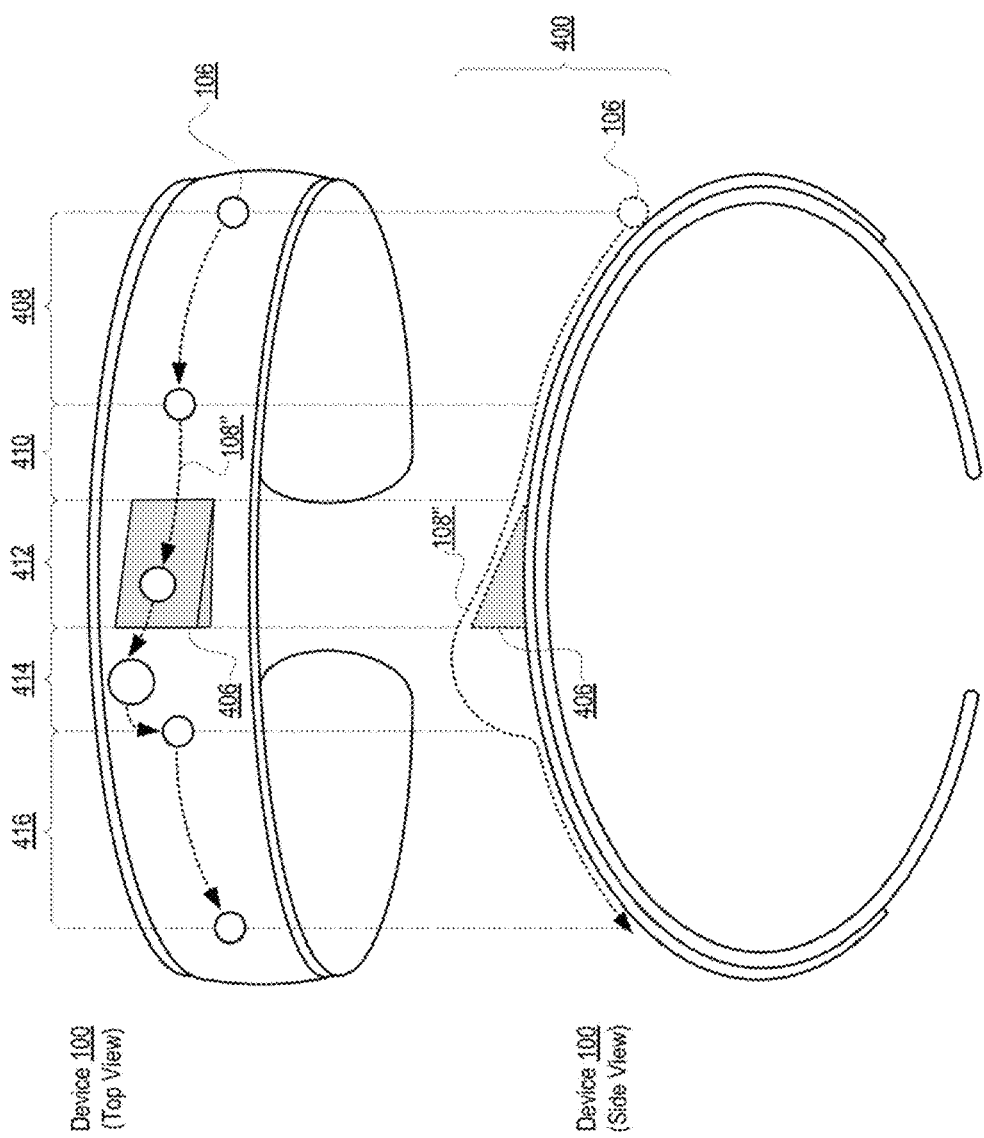
FIG. 4 illustrates an example device comprising a system to account for simulated physical behavior in accordance with at least one embodiment of the present disclosure.

FIG. 4 illustrates an example device comprising a system to account for simulated physical behavior in accordance with at least one embodiment of the present disclosure. FIG. 4 comprises both a top view and a side view of device 100 as originally illustrated in FIG. 1, wherein item numbering for items that are identical to FIG. 1 have been omitted for the sake of clarity. An example of movement for content object 106 is shown at 400. Arrow 108" discloses that content object 106 may move across the curved surface of display 104 while also jumping over ramp 406. Ramp 406 is virtual (e.g., a portion of the presented content), and has been shown only for the sake of explanation. Ramp 406 would not be visible when actually viewing device 100 from the side since the content is presented only on display 104 as a two-dimensional representation of three dimensions, and the surface of display 104 is not visible from the side view. After jumping over ramp 406, content object 106 may follow arrow 108" and continue moving down the side of display 104. An example of content that may employ movement such as disclosed at 400 would be a videogame wherein a game piece such as a ball, automobile, motorcycle, etc. is to perform a stunt by jumping off of ramp 406.

The movement and appearance of content object 106 may be modified to reflect the curved surface on which the content is being presented. For example, the speed and size of content object 106 may increase as it climbs the side of display 104 in region 408, just as a real-world physical object would when climbing to the top of an inclined surface (e.g., hill). In region 410 the speed and size may stabilize until content object 106 begins to climb ramp 406. Looking at the physical behavior of content object 106, when viewed from above, the size should again increase and the speed should decrease when climbing ramp 406. In region 414 content object 106 may be in simulated "flight" after jumping from ramp 406, and thus, may grow substantially in size and speed may again be reduced. Upon landing in region 416, content object 106 may return to normal size (e.g., the size seen in region 408) and may then start increasing in speed as it begins to roll downhill along the curved surface of display 104.

Figure 5:
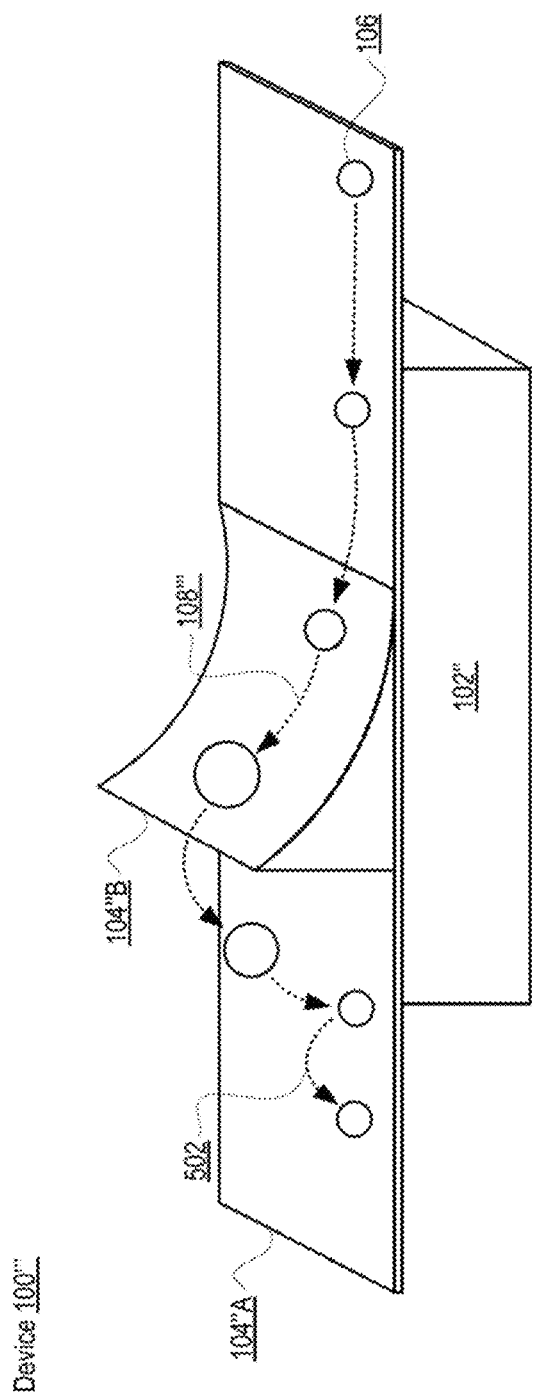
FIG. 5 illustrates an example multi-display device comprising a system to account for irregular display surface physics in accordance with at least one embodiment of the present disclosure.

FIG. 5 illustrates an example multi-display device comprising a system to account for irregular display surface physics in accordance with at least one embodiment of the present disclosure. As opposed to the example of FIG. 4 wherein ramp 406 was representation from the content being presented, in device 100'" display 104" may comprise multiple portions (e.g., portions 104"A and 104" B) including at least one curved surface in portion 104" B. Display portions 104"A and 104" B may be at least coupled to CPU 102'". Again, while a particular configuration for device 100'" has been shown in FIG. 5 wherein display portions 104"A and 104" B are mounted upon CPU 102", this implementation is merely for the sake of explanation. Other configurations consistent with embodiments of the present disclosure are also possible.

Following the path of arrow 108'", content object 106 may maintain uniform size and speed as it moves towards display portion 104"B. On reaching display portion 104"B, content object 106 may increase in size and/or decrease in speed as it traverses the upward curvature of the display surface. After jumping from the top of the upwardly curved surface of display portion 104"B, flight may be simulated by increasing the size and decreasing the speed of content object 106. Falling may be simulated by a decrease in forward momentum represented by returning content object 106 to original size and speed. In one embodiment, a particular object, type of material, etc. may also be simulated by further altering movement behavior for content object 106. As shown at 502, an elastic material (e.g., rubber) may be simulated by content object 106 bouncing after returning to the surface of display 104"A.

Figure 6:
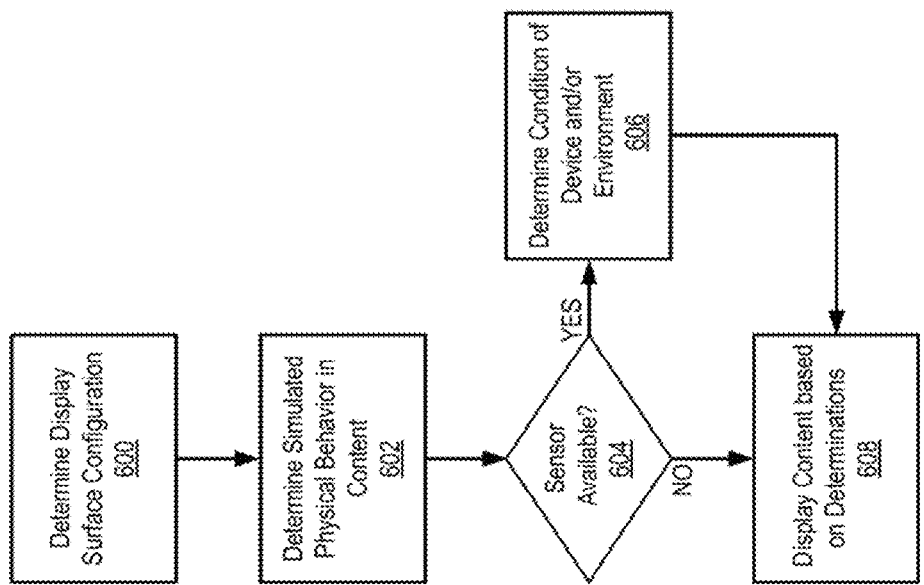
FIG. 6 illustrates example operations for a system to account for irregular display surface physics in accordance with at least one embodiment of the present disclosure.

FIG. 6 illustrates example operations for a system to account for irregular display surface physics in accordance with at least one embodiment of the present disclosure. In operation 600 a device comprising at least a display may determine a surface configuration for the display. For example, the device may determine display characteristics such as size, curvature, capabilities (e.g., colors, resolution, etc.), connectivity, etc. Operation 600 may take place in any device, but may be especially important in devices where the display is only coupled to the device via wired/wireless communication may be interchanged. In operation 602 the device may also determine simulated physical behavior in content to be presented on the display. For example, simulated physical behavior may include the movement of objects within the content (e.g., movement across the surface of the display, perpendicular to the surface of the display, etc.), environmental effects in the content (e.g., light/dark, blowing wind, flowing water, etc.), interactive features in the content (e.g., user touch interaction), etc.

A determination may then be made in operation 604 as to the availability of at least one sensor in the device. Availability may include both existence of the at least one sensor in the device and also the ability to utilize the at least one sensor. The at least one sensor may sense device conditions and/or environmental conditions. Device conditions may include, but are not limited to, movement (e.g., direction, speed and/or acceleration), orientation, etc. Environmental conditions may include, but are not limited to, gravitational force direction, light/dark, temperature, etc. If it is determined in operation 604 that at least one sensor is available, then in operation 606 device conditions and/or environmental conditions may be determined. Following either a determination operation 604 that at least one sensor is not available or operation 606 wherein device conditions and/or environmental conditions may be determined, in operation 608 the content may be displayed based on the determinations made in operations 600, 602 and possibly 606. The content may be presented on the device display based at least on simulated physical behavior associated with the curved surface. For example, during presentation the movement of content objects may be modified to account for the amount of curvature Moreover, if at least one sensor was determined to be available in the device, the behavior of the content may be further modified to also take into account device and/or environmental conditions. This may include altering the appearance and/or the movement of content objects to account for device movement, orientation, environmental conditions, etc.

While FIG. 6 illustrates operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories. Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to a system to account for irregular display surface physics. In one embodiment, an example device may comprise a display including at least one curved surface on which content may be presented. The content may be presented based at least on simulated physical behavior associated with the curved surface. For example, the device may determine the display surface configuration, determine the simulated physical behavior in the content and present the content based at least on these determinations. The content may then appear to behave in accordance with the physics of the curved surface. The device may also comprise sensors to determine at least one of device or environmental condition such as, for example, gravitational force direction, device motion, etc. The device may then take into account the physical behavior associated with the curved surface in view of sensed device or environmental condition when presenting the content.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system to account for irregular display surface physics, as provided below.

Example 1

According to this example there is provided a device including a display including at least one curved surface on which content is presented and a user interface module to cause the content to be presented on the display based at least on simulated physical behavior associated with the curved surface.

Example 2

This example includes the elements of example 1, wherein the display is incorporated within the device.

Example 3

This example includes the elements of example 1, wherein the display is external to the device and coupled to at least the user interface module via a wired or wireless link.

Example 4

This example includes the elements of any of examples 1 to 3, wherein the device is a mobile device.

Example 5

This example includes the elements of example 4, wherein the mobile device is wearable on a portion of a user's body.

Example 6

This example includes the elements of any of examples 1 to 5, wherein the user interface module is to cause a portion of content to be presented differently based on where on the curved surface the portion of content is to be presented.

Example 7

This example includes the elements of example 6, wherein causing the portion of content to be presented differently comprises altering at least one of the size, shape or color of the portion of content based on where on the curved surface the portion of content is to be presented.

Example 8

This example includes the elements of any of examples 6 to 7, wherein the user interface module is to cause the portion of content to be presented differently based on simulated physical movement of the portion of content across the curved surface.

Example 9

This example includes the elements of example 8, wherein the simulated physical movement of the portion of content across the curved surface is caused by user touch interaction with the curved surface.

Example 10

This example includes the elements of example 9, wherein the user interface module is to cause the portion of content to be presented differently based on a simulated physical distance of the portion of content from the curved surface during the simulated physical movement of the portion of content across the curved surface.

Example 11

This example includes the elements of example 10, wherein the display comprises a plurality of surfaces in a non-planar arrangement, the user interface module being to cause the portion of content to be presented differently based on the simulated physical distance and the simulated physical location of the portion of content with respect to a particular surface in the plurality of surfaces on which the portion of content is to be displayed.

Example 12

This example includes the elements of any of examples 6 to 11, wherein the device further comprises at least one sensor to sense at least one of device conditions or environmental conditions.

Example 13

This example includes the elements of example 12, wherein the at least one sensor is to sense gravitational force direction and the user interface module is to cause the portion of content to be presented on the curved surface based also on the sensed gravitational force direction.

Example 14

This example includes the elements of any of examples 12 to 13, wherein the at least one sensor is to sense movement of the device and the user interface module is to cause the portion of content to be presented on the curved surface based also on the sensed movement of the device.

Example 15

This example includes the elements of any of examples 1 to 14, wherein the user interface module is further to cause at least one of sound output or tactile output to be generated by the device based at least on the simulated physical behavior associated with the curved surface.

Example 16

This example includes the elements of any of examples 1 to 15, wherein the device further comprises at least one sensor to sense at least one of device or environmental conditions, the user interface module being to cause the portion of content to be presented on the curved surface also based on the sensed conditions.

Example 17

According to this example there is provided a method including determining in a device a configuration for a display including at least one curved surface on which content is presented, determining simulated physical behavior in the content and causing the content to be displayed based at least on simulated physical behavior associated with the curved surface.

Example 18

This example includes the elements of example 17, wherein causing the content to be displayed comprises causing a portion of content to be presented differently based on where on the curved surface the portion of content is to be presented.

Example 19

This example includes the elements of example 18, wherein causing the portion of content to be presented differently comprises altering at least one of the size, shape or color of the portion of content based on where on the curved surface the portion of content is to be presented.

Example 20

This example includes the elements of any of examples 18 to 19, wherein causing the content to be displayed comprises causing the portion of content to be presented differently based on simulated physical movement of the portion of content across the curved surface.

Example 21

This example includes the elements of example 20, wherein the simulated physical movement of the portion of content across the curved surface is caused by user touch interaction with the curved surface.

Example 22

This example includes the elements of any of examples 20 to 21, wherein causing the content to be displayed comprises causing the portion of content to be presented differently based on a simulated physical distance of the portion of content from the curved surface during the simulated physical movement of the portion of content across the curved surface.

Example 23

This example includes the elements of example 22, wherein the display comprises a plurality of surfaces in a non-planar arrangement and causing the content to be displayed comprises causing the portion of content to be presented differently based on the simulated physical distance and the simulated physical location of the portion of content with respect to a particular surface in the plurality of surfaces on which the portion of content is to be displayed.

Example 24

This example includes the elements of any of examples 17 to 23, further comprising determining if at least one sensor is available in the device to sense at least one of device or environmental conditions and causing the content to be presented also based on the sensed conditions.

Example 25

This example includes the elements of example 24, wherein the sensed conditions include at least one of gravitational force direction or device movement.

Example 26

This example includes the elements of any of examples 17 to 25, further comprising causing at least one of sound output or tactile output to be generated by the device based at least on the simulated physical behavior associated with the curved surface.

Example 27

According to this example there is provided a system including at least a device, the system being arranged to perform the method of any of the examples 17 to 26.

Example 28

According to this example there is provided a chipset arranged to perform the method of any of the examples 17 to 26.

Example 29

According to this example there is provided at least one machine readable medium comprising a plurality of instructions that, in response to be being executed on a computing device, cause the computing device to carry out the method according to any of the examples 17 to 26.

Example 30

According to this example there is provided a device configured for use with a system to account for irregular display surface physics, the device being arranged to perform the method of any of the examples 17 to 26.

Example 31

According to this example there is provided a device having means to perform the method of any of the examples 17 to 26.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
a wearable display including at least one curved surface to present content, the wearable display including a first display portion, a second display portion, and a third display portion, the second display portion being disposed between the first display portion and the third display portion;
at least one sensor to sense at least gravitational force direction; and
system circuitry to:
cause first content to be displayed on each of the first, second, and third display portions;
cause a content object to be displayed on at least one of the first, second, or third display portions, wherein the content object is overlaid over at least a portion of the first content;
cause the content object to move across the curved surface of the display wherein, when the content object is in the first display portion, the content object is decelerating relative to the first content for at least a portion of the first display portion, a magnitude of the deceleration being based on the sensed gravitational force direction and the curvature of the first display portion and, when the content object is in the third display portion, the content object is accelerating relative to the first content for at least a portion of the third display portion, a magnitude of the acceleration being based on the sensed gravitational force direction and the curvature of the third display portion;
resize the content object as it moves across the display, wherein a size of the content object is based on where on the curved surface of the display the content object is displayed; and
reshape the content object as it moves across the display, wherein a shape of the content object is based on where on the curved surface of the display the content object is displayed.

2. The device of claim 1, wherein the display is incorporated within the device or is external to the device and coupled to at least the system circuitry via a wired or wireless link.

3. The device of claim 1, wherein the system circuitry is to cause the content object to be presented differently based on simulated physical movement of the content object across the curved surface.

4. The device of claim 1, wherein the simulated physical movement of the content object across the curved surface is caused by user touch interaction with the curved surface.

5. The device of claim 1, wherein the display comprises a plurality of surfaces in a non-planar arrangement.

6. The device of claim 1, wherein the device further comprises at least one other sensor to sense at least one of device conditions or environmental conditions.

7. The device of claim 1, wherein the at least one sensor further senses a movement of the device and the system circuitry is to cause the content object to be presented on the curved surface based also on the sensed movement of the device.

8. The device of claim 1, wherein the system circuitry is further to cause at least one of sound output or tactile output to be generated by the device based at least on the simulated physical behavior associated with the curved surface.

9. A method, comprising:
determining a gravitational force direction via at least one communicably coupled sensor;
determining in a device a configuration for a wearable display including at least one curved surface on which content is presented, the wearable display including a first display portion, a second display portion, and a third display portion, the second display portion being disposed between the first display portion and the third display portion;
causing first content to be displayed on each of the first, second, and third display portions;
causing a content object to be displayed on at least one of the first, second, or third display portions, wherein the content object is overlaid over at least a portion of the first content;
causing the content object to move across the curved surface of the display, wherein, when the content object is in the first display portion, the content object is decelerating relative to the first content for at least a portion of the first display portion, a magnitude of the deceleration being based on the sensed gravitational force direction and the curvature of the first display portion and, when the content object is in the third display portion, the content object is accelerating relative to the first content for at least a portion of the third display portion, a magnitude of the acceleration being based on the sensed gravitational force direction and the curvature of the third display portion;
resizing the content object as it moves across the display, wherein a size of the content object is based on a location on the curved surface of the display where the content object is displayed; and
reshaping the content object as it moves across the display, wherein a shape of the content object is based on where on the curved surface of the display the content object is displayed.

10. The method of claim 9, wherein the content object is presented differently based on simulated physical movement of the content object across the curved surface.

11. The method of claim 10, wherein the content object is presented differently based on a simulated physical distance of the content object from the curved surface during the simulated physical movement of the content object across the curved surface.

12. The method of claim 9, further comprising:
determining if at least one other sensor is available in the device to sense at least one of device or environmental conditions; and
causing the content object to be presented also based on the sensed conditions.

13. The method of claim 12, wherein the sensed conditions include device movement.

14. The method of claim 9, further comprising:
causing at least one of sound output or tactile output to be generated by the device based at least on the simulated physical behavior associated with the curved surface.

15. A machine-readable non-transitory storage device having stored thereon instructions that when executed by one or more processors result in the following operations comprising:
determine a gravitational force direction via at least one communicably coupled sensor;
determine in a device a configuration for a wearable display including at least one curved surface on which content is presented, the wearable display including a first display portion, a second display portion, and a third display portion, the second display portion being disposed between the first display portion and the third display portion;
cause first content to be displayed on each of the first, second, and third display portions;
cause a content object to be displayed on at least one of the first, second, or third display portions, wherein the content object is overlaid over at least a portion of the first content;
cause the content object to move across the curved surface of the display, wherein, when the content object is in the first display portion, the content object is decelerating relative to the first content for at least a portion of the first display portion, a magnitude of the deceleration being based on the sensed gravitational force direction and the curvature of the first display portion and, when the content object is in the third display portion, the content object is accelerating relative to the first content for at least a portion of the third display portion, a magnitude of the acceleration being based on the sensed gravitational force direction and the curvature of the third display portion;
resize the content object as it moves across the display, wherein a size of the content object is based on a location on the curved surface of the display where the content object is displayed; and
reshape the content object as it moves across the display, wherein a shape of the content object is based on where on the curved surface of the display the content object is displayed.

16. The machine-readable non-transitory storage device of claim 15, wherein the content object is presented differently based on simulated physical movement of the content object across the curved surface.

17. The machine-readable non-transitory storage device of claim 16, wherein the content object is presented differently based on a simulated physical distance of the content object from the curved surface during the simulated physical movement of the content object across the curved surface.

18. The machine-readable non-transitory storage device of claim 15, further comprising instructions that when executed by one or more processors result in the following operations comprising:
determine if at least one other sensor is available in the device to sense at least one of device or environmental conditions; and
cause the content object to be presented also based on the sensed conditions.

19. The machine-readable non-transitory storage device of claim 18, wherein the sensed conditions include device movement.

20. The machine-readable non-transitory storage device of claim 15, further comprising instructions that when executed by one or more processors result in the following operations comprising:
cause at least one of sound output or tactile output to be generated by the device based at least on the simulated physical behavior associated with the curved surface.

* * * * *